Nov. 29, 1955 R. A. GROSSELFINGER 2,725,108
METHOD OF OPERATING AN AIRCRAFT PROPULSION SYSTEM
Filed Aug. 21, 1952 3 Sheets-Sheet 1

Inventor:
Robert A. Grosselfinger
by H. F. Kirkpatrick.
Attorney

Nov. 29, 1955 R. A. GROSSELFINGER 2,725,108
METHOD OF OPERATING AN AIRCRAFT PROPULSION SYSTEM
Filed Aug. 21, 1952 3 Sheets-Sheet 2

Inventor:
Robert A. Grosselfinger
by H. L. Kirkpatrick Attorney

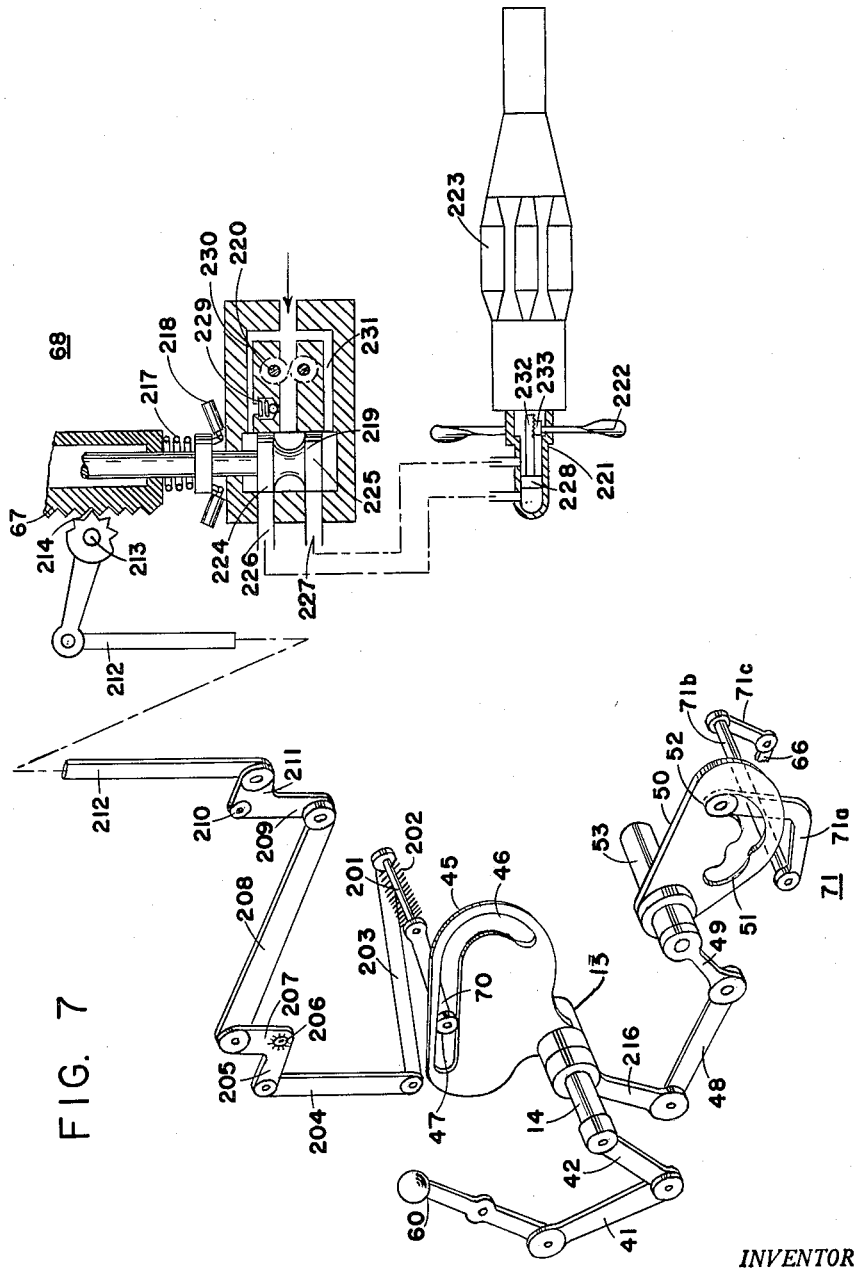

United States Patent Office 2,725,108
Patented Nov. 29, 1955

2,725,108

METHOD OF OPERATING AN AIRCRAFT PROPULSION SYSTEM

Robert A. Grosselfinger, Washington, D. C., assignor to Grovar, Incorporated, Washington, D. C., a corporation of Delaware Application August 21, 1952, Serial No. 305,563

1 Claim. (Cl. 170—135.74)

This invention relates primarily to aircraft having turbine-type power plants wherein, particularly in military aircraft, a rapid increase in power response is required.

In aircraft, for example, whether of fixed or rotating wing type (or combinations thereof) a rapid power response is often required in a positive direction, i. e. an increase in power, which may or may not be employed to accelerate the flight of the aircraft, though that is probably the most frequent need for the invention in conventional fixed-wing aircraft, for example, a rejected landing or carrier wave-off. In helicopters, too, the invention is useful in connection with both landings and take-offs. In any of these cases, the invention involves the utilization of the kinetic energy stored in a rotating system which is made available to either propeller or rotor by sufficiently increasing the pitch angle to absorb available rotor kinetic energy consequent with deceleration of the engine. Concurrently, the fuel flow is increased, as in the normal case, and the final steady state power derived at a lower R. P. M. As a result, during the few seconds transient period, the energy initially stored in the propeller or rotor is reduced by decreasing the speed and the incremental energy made available for propulsive purposes.

It will be appreciated that the invention involves the alteration of the input schedule of a turbine-type power plant where there are two or more controlled variables of which engine speed is one, in the control of the power plant.

Figure 6:
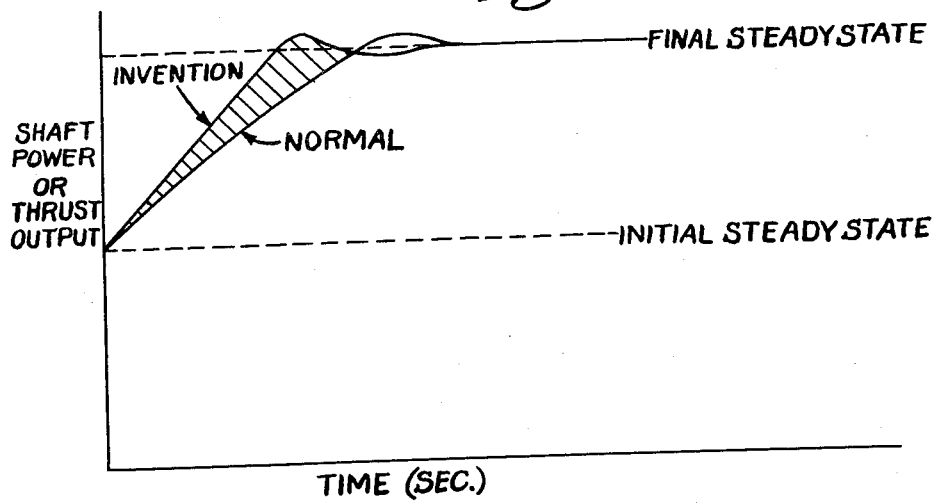

Fig. 6 plots an illustrative example of the incremental energy made available for propulsive purposes in accordance with the present invention; and Fig. 7 is a diagrammatic view of a turbine-rotor power plant control system in accordance with the present invention.

Referring to the drawings, a turbine power plant which drives a propeller shall be used as an explanatory example. A power plant of this type has performance characteristics as shown in Figs. 1 and 2.

Figure 1:
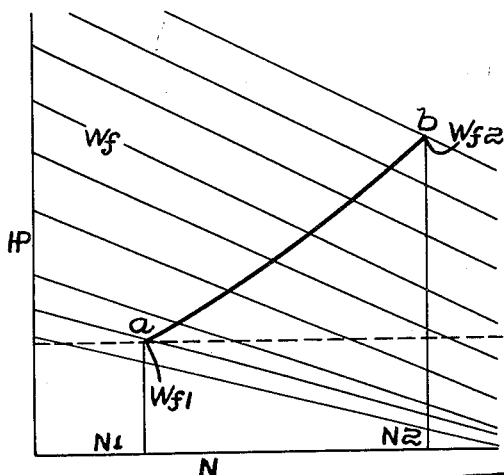
Figs. 1 and 2 illustrate performance characteristics of turbine-type power plants.

Fig. 1 shows the output horsepower available for different combinations of engine speed N and fuel flow $W_f$ to the engine. It may be seen that for any given horsepower, as shown by the dashed line, there are many combinations of engine speed N and fuel flow $W_f$ which will provide this power. It may further be seen that the assumed horsepower represented by the horizontal dashed line can be derived most efficiently if it is derived at a combination of N and $W_f$ which would represent the use of the minimum fuel flow. It is this consideration which is generally applied to the performance data shown in Fig. 1 to establish the optimum combination of N and $W_f$ for deriving any power. The joining of these points, as shown by the heavy curve of Fig. 1, establishes the optimum operating curve of the engine. Fig. 2 replots the optimum operating data of Fig. 1 and provides a relationship between engine speed and fuel flow which the controller or controllers establish.

Figure 2:
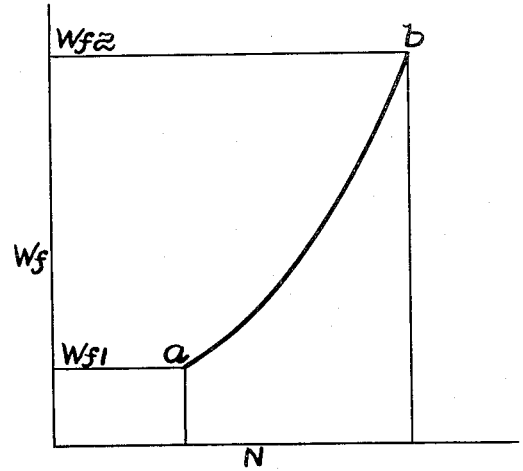

The control means to obtain the desired performance can be arrived at in many different ways but it can be established that the speed of the engine is controlled as well as the fuel flow to the engine so as to always derive a combination which is established by the relationship shown in Fig. 2. For purposes of this description, it will be assumed that the engine speed is controlled by varying the propeller blade angle $\beta$ thereby controlling the load on the engine and that the fuel flow is controlled by means of some schedule corresponding to the relationship given in Fig. 2 with necessary corrections for airplane operating conditions.

Figure 3:
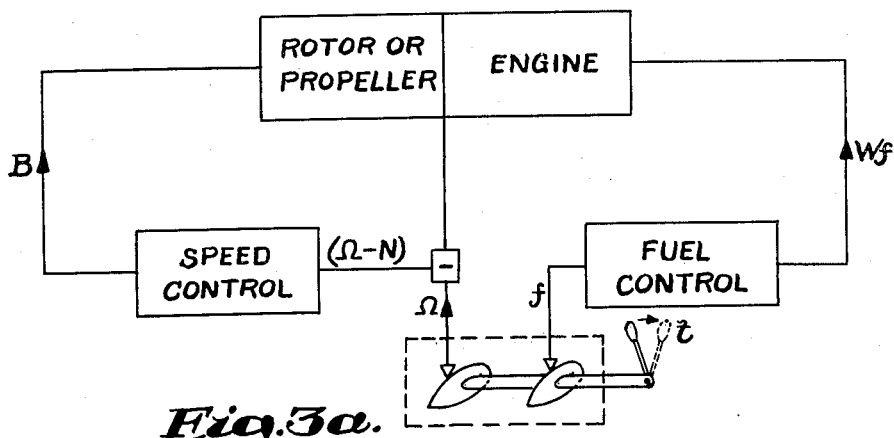
Fig. 3 illustrates an example of the overall system of Figs. 1 and 2.
Figure 5:
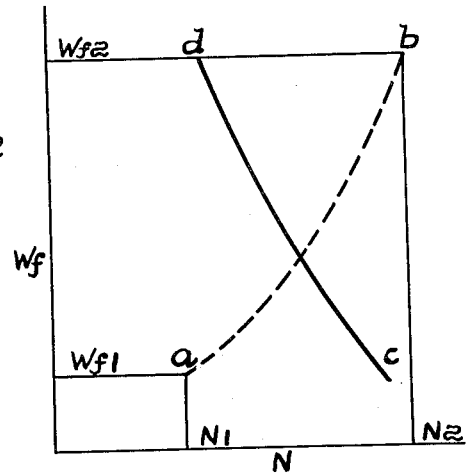

The overall system, including the engine, propeller and controllers representing this conventional example are shown in Fig. 3, a more complete showing being that of Slatter 2,628,684, particularly his Fig. 5.

The system shown operates as follows: The angular displacement of the power lever $t$ represents a percentage increase in desired power output. The proper $W_f$ and N values corresponding to the power required as established by Fig. 1 are expressed by the two cams shown and are introduced into the system by the cam follower displacements $\Omega$ and $f$.

If an increase in power from point $a$ to point $b$ is desired, the power lever introduces a rotational motion of the common cam shaft introducing position changes in the cam followers which are simultaneously introduced due to their common rotation on the same shaft. The changes in position of the cam followers are in the form of displacements usually translated into forces by means of servo valves. As the result of the action of the coordinator, it may be stated that forces are established which are functions of the desired engine speed and the correspondingly correct fuel flow for optimum efficiency, the relation for which is more clearly indicated in Fig. 2.

The input force $f$ to the fuel control changes the fuel flow from $W_{f1}$ to $W_{f2}$ while the force $\Omega$ may be considered to be introduced into a conventional flyball governor as proportional to a change from $N_1$ to $N_2$. The incremental increase in the applied force to the governor alters the position of the governor pilot valve thereby altering the blade servo actuating pressure which affects the blade angle $\beta$ of the propeller in such a way as to increase the speed of the engine. The speed increase of the engine drives the governor flyballs faster until the force imposed by the flyballs is equal to the imposed opposite force by the demand signal originating from the speed cam in the coordinator. When these forces are equal, the error between the desired and actual speed is equal to zero and the engine has reached the new R. P. M. $N_2$. The foregoing will occur independently of the fuel flow, however, if the fuel flow is properly scheduled to a value corresponding to $W_{f2}$, the power derived will be equal to that at point $b$ of Fig. 1.

In considering the transient time period that is involved in increasing the power as described, it may be noted that a portion of the energy content of the fuel is used as work in accelerating the engine rotor speed from $N_1$ to $N_2$ R. P. M. The amount of work absorbed and stored by the engine rotor may be expressed as one half the rotor polar moment of inertia times the difference between the final R. P. M. (radians per second) squared and the initial speed in (radians per second) squared, i. e.

$$W = \frac{I}{2}(N_2{}^2 - N_1{}^2)$$

where $W$ = work in foot pounds
$I$ = inertia in foot pounds second squared
$N$ = rotor speed in radians per second The absorption of this work during a transient power increase from $a$ to $b$, Fig. 1, deducts from the momentary useful work available for delivery to the propeller during the transient period and thereby compromises the power response characteristics of the power plant as compared to an alternate method which consists of the invention to be described.

Figure 4:
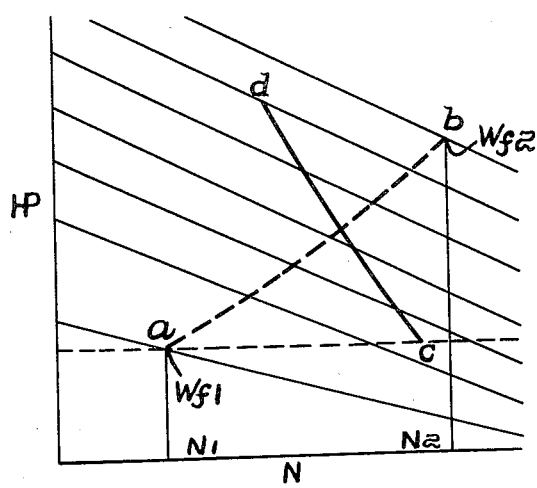
Figs. 4 and 5 are modified versions of the same data provided in Figs. 1 and 2 respectively, in accordance with the present invention.

Figs. 4 and 5 are modified versions of the same data provided in Figs. 1 and 2 respectively. The indicated modifications, i. e., the use of operating curves $c$—$d$ rather than $a$—$b$ are for the purpose of deriving better useful power response characteristics at the expense of optimum efficiency. Point $c$ corresponds to the identical minimum or idle horsepower value formerly used but it is derived at a much higher engine R. P. M. The high R. P. M. point does not necessarily have to correspond to the minimum or idle horsepower but can represent any lower power limit for the normal power operating range of the engine. Upon increasing power from point $c$ to another operating point on the new curve, point $d$ for example, the work previously stored in the form of kinetic energy on originally accelerating the engine to point $c$ becomes available as useful work and thereby provides improved engine power response characteristics. The use of curve $c$—$d$ insures the release of kinetic energy while increasing the power and the absorption of energy while decreasing power which is the converse of the control of the system in accordance with the operating curve $a$—$b$, thereby providing better output power response characteristics in both the positive and negative directions.

Figure 3A:
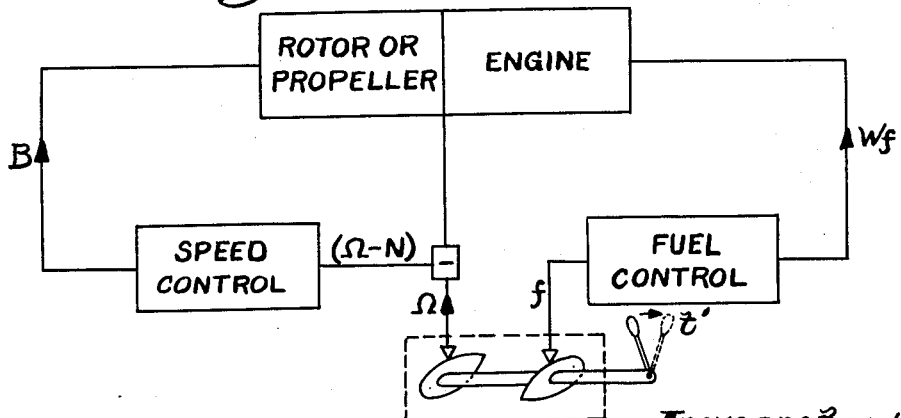
Fig. 3a illustrates an example of the modification of this invention.

To accomplish this desirable effect, the entire system shown in Fig. 3 remains the same with the exception of, in effect, reversing the engine speed cam $f'$ in the coordinator as illustrated in Fig. 3a, and in Fig. 7 wherein the cam slot 46 of Fig. 5 of the above-identified Slatter patent is reversed in accordance with the present invention, thereby effecting a demand for decreased engine speed with increased fuel flow as controlled by the power lever $t'$. The exact contour of the cam is established by the corresponding cam providing $f'$ and the selected operating curve $c$—$d$ of Figs. 4 and 5. In this manner there is provided the novel combination of this invention having the advantages and utility hereinbefore described. It will, of course, be appreciated that the actual movement of the power lever $t'$ may be accomplished manually, or automatically by suitable means (not shown), or, alternatively, separate but related controls may be provided for the two cams (or equivalent) of Fig. 3a.

Referring to Fig. 6, the shaded area would roughly correspond to the power times the time or work which is made available by the work $$\frac{I}{2}(N_1{}^2 - N_2{}^2) \text{ ft. lbs.}$$

given up by decelerating the engine rotor.

In the detailed showing of Fig. 7, the throttle control lever 60 is connected, by a link 41, to the arm 42 which is keyed to the valve member 14 of a hydraulic servomotor, the sleeve 13 of which is keyed to a member 45 having a cam slot 46 in which is engaged a roller 47 on a lever 70 mechanically connected to the control element 67 of the constant-speed mechanism 68 for controlling the datum setting of the constant-speed mechanism. For effecting this connection the arm 70 is made fast with a shaft 201 which has a bearing 202 in a wall (not shown) of the servomotor and extends outwardly thereof. At its outer end the shaft 201 has fast with it a second arm 203 which is connected by a link 204 to one arm 205 of a bell-crank lever pivoted at 206 to a stationary member (not shown). The other arm 207 of the bell-crank lever is connected by a link 208 to one arm 209 of a second bell-crank lever pivoted at 210 to a stationary member (not shown) and the second arm 211 of this lever is connected by a link 212 to rock, about a pivot 213, a toothed quadrant 214 of the constant-speed mechanism 68 of a known type.

Keyed to the valve member 14 is an arm 216 which is linked at 48 to a second arm 49 which carries a member 50 having a cam slot 51 for similarly adjusting the fuel valve by means of a roller 52 on the bell-crank lever 71 connected at 66 to the fuel valve. Actually said bell-crank lever comprises an arm 71a by which the roller 52 is carried and which is fast with the shaft 71b, journalled in a wall (not shown) of the servomotor, and also carrying an arm 71c to which latter the link 66 is connected.

It will be seen that, on moving the throttle lever 60 to open the fuel valve (not shown) by the connection 66, the datum setting of the constant-speed mechanism will be changed to increase pitch sufficiently to decrease turbine speed as above explained. For reverse movement of the pilot's throttle lever (i. e., to reduce the power of the unit by reducing the fuel supply) the action above described is reversed.

Fig. 7 shows the control element 67 of the constant-speed mechanism acting, through a spring 217 and a governor 218, on a valve member 219 for controlling a hydraulic supply from a pump 220 to the pitch-changing mechanism (indicated at 221) of the propeller 222 of a gas turbine unit 223. In the position shown the lands 224 and 225 are respectively blocking supply lines 226 and 227 to opposite sides of a piston 228 of the pitch changing mechanism and thus hydraulically lock the latter. A relief valve 229 in these conditions by-passes the output of the pump 220 to a passage 230 leading to the pump intake. Movement of the valve member 219 downwardly in the figure directs the pump output through the line 227 to one of the piston 228 and movement of the latter expresses the fluid on its opposite side through the line 226 and the passage 230 back to the pump intake. A reverse operation from the position shown of the valve member 219 reversely moves the piston 228 and the fluid is expressed through the line 227 and a further return passage 231 to the pump. As indicated, the piston 228, in known manner, has a rack 232 engaging toothed segments 233 fast with the propeller blades for varying the pitch.

In the appended claim, the word "rotor" is intended to include a propeller.

Having described my invention, I claim:

The method of operating a propulsion system for an aircraft having a turbine power plant and a controllable pitch rotor driven by the turbine power plant, which includes the steps of increasing the flow of fuel to the turbine to increase the power thereof and simultaneously increasing the pitch of the rotor to a sufficient extent to decrease the speed of the turbine simultaneously with the increase of power, thereby releasing and utilizing the kinetic energy stored in the rotating turbine-rotor system for propulsion of the aircraft.

References Cited in the file of this patent

UNITED STATES PATENTS

| Number | Name | Date |
|---|---|---|
| 2,280,835 | Lysholm | Apr. 28, 1942 |
| 2,437,546 | Meripol | Mar. 9, 1948 |
| 2,536,158 | Chamberlin et al. | Jan. 2, 1951 |
| 2,616,508 | Mock | Nov. 4, 1952 |
| 2,628,684 | Slatter et al. | Feb. 17, 1953 |
| 2,631,677 | Kochenburger et al. | Mar. 17, 1953 |